United States Patent
Hagger et al.

(10) Patent No.: US 10,631,687 B2
(45) Date of Patent: Apr. 28, 2020

(54) VEGETABLE SPINNERS

(71) Applicant: DKB Household UK Limited, Farnborough, Hampshire (GB)

(72) Inventors: Sam Hagger, Woking (GB); Nicholas Hunt, Brackley (GB); Grant Race, Havant (GB)

(73) Assignee: DKB HOUSEHOLD UK LIMITED (GB)

( * ) Notice: Subject to any disclaimer, the term of this patent is extended or adjusted under 35 U.S.C. 154(b) by 340 days.

(21) Appl. No.: 15/541,366

(22) PCT Filed: Jan. 14, 2016

(86) PCT No.: PCT/EP2016/050676
§ 371 (c)(1),
(2) Date: Jun. 30, 2017

(87) PCT Pub. No.: WO2016/113355
PCT Pub. Date: Jul. 21, 2016

(65) Prior Publication Data
US 2017/0360258 A1    Dec. 21, 2017

(30) Foreign Application Priority Data

Jan. 14, 2015 (EP) .................................... 15151177

(51) Int. Cl.
*A47J 43/24* (2006.01)
*A47J 43/04* (2006.01)

(52) U.S. Cl.
CPC .................................... *A47J 43/24* (2013.01)

(58) Field of Classification Search
CPC ...... A47J 43/24; A47J 43/044; A47J 43/0711; A47J 43/284; A47J 43/0727; A47J 44/00
See application file for complete search history.

(56) References Cited

U.S. PATENT DOCUMENTS 2,370,504 A    2/1945  Hansen
5,184,544 A    2/1993  Ling
(Continued)

FOREIGN PATENT DOCUMENTS

CN    203776743 U    8/2014
DE       832192 C    2/1952

OTHER PUBLICATIONS

Machine Translation of Bao: CN 203776743 performed Aug. 2019—Reference date Aug. 2014 (Year: 2019).*

*Primary Examiner* — Brian W Jennison
(74) *Attorney, Agent, or Firm* — Dorsey & Whitney LLP

(57) ABSTRACT

A basket for a vegetable spinner comprises a generally circular base (40), integral with the outer edge of which is an upstanding side wall (42). The base affords a rotary mount (46) in its centre defining an axis about which the basket rotates in the direction of rotation. The side wall (42) comprises a plurality of first webs (48) integral with and upstanding from the outer edge of the base (40) and spaced apart in a circumferential direction and a plurality of second webs (50) integral with the first webs (48) and spaced apart in the axial direction, whereby the first and second webs define a plurality of apertures. The side wall (42) includes a plurality of inwardly projecting portions (56) which extend over at least a major proportion of the height of the side wall and are spaced apart in the circumferential direction by spacer portions (54) of substantially part-circular shape in cross-section perpendicular to the axis of rotation.

13 Claims, 5 Drawing Sheets

(56) References Cited

U.S. PATENT DOCUMENTS

| | | | |
|---|---|---|---|
| 5,904,090 A | 5/1999 | Lillelund et al. | |
| 2007/0256315 A1* | 11/2007 | Wong | A47J 43/24 34/58 |
| 2010/0263555 A1* | 10/2010 | Mah | A47J 43/24 99/495 |

* cited by examiner

VEGETABLE SPINNERS

CROSS-REFERENCE TO RELATED APPLICATIONS

This application is a national stage application of International Application No. PCT/EP2016/050676, filed Jan 14, 2016, and entitled "VEGETABLE SPINNERS", which claims priority to European Application No. 15151177.1, filed Jan 14, 2015, both of which are hereby incorporated by reference herein in their entireties for all purposes.

TECHNICAL FIELD

The present disclosure relates to vegetable spinners, that is to say devices for spinning vegetables after they have been washed in order to substantially dry them as a result of the centrifugal force acting on the droplets of water on the vegetables and causing those droplets to fly outwardly. It is frequently leaves of lettuce and other salad plants that are dried in this manner and these devices are therefore commonly referred to as salad spinners.

BACKGROUND

Salad spinners conventionally consist of an outer open-topped container or bowl, the internal surface of the base of which affords a central rotary support on which an apertured, open-topped basket is supported for rotation about a vertical axis. The outer bowl is closed, in use, by a lid which carries manually operable actuating means, such as a pivotable lever or a draw string, which is connected to transmit rotary motion to the basket in order to spin it at high speed. The actuating means is typically connected to rotate a gear wheel beneath the lid which is rotationally coupled to a rotary transmission member which is rotationally coupled also to the basket.

Although conventional salad spinners are relatively effective it is commonly observed that after spinning wet lettuce leaves they are still appreciably wet and have clearly visible drops of water on their surfaces. The present disclosure provides a vegetable spinner and particularly an apertured basket for such a spinner which reliably results in a significantly greater proportion of the water on the surface of lettuce leaves being removed and thus in the treated lettuce being considerably drier than is normally the case.

SUMMARY

According to a first aspect of the present disclosure a basket for a vegetable spinner comprises a generally circular base, integral with the outer edge of which is an upstanding side wall, the base affording a rotary mount in its centre defining an axis about which, in use, the basket rotates in a direction of rotation, the side wall comprising a plurality of first webs integral with and upstanding from the outer edge of the base and spaced apart in the circumferential direction and a plurality of second webs integral with the first webs and spaced apart in the axial direction, whereby the first and second webs define a plurality of apertures, characterised in that the side wall includes a plurality of inwardly projecting portions which extend over at least a major proportion of the height of the side wall and are spaced apart in the circumferential direction by spacer portions of substantially part-circular shape in cross-section perpendicular to the axis of rotation.

Lettuce leaves and the like have a generally planar structure and when lettuce leaves are spun in a conventional salad spinner, it is found that at least a substantial proportion of them tend to lie flat against the inner surface of the cylindrical side wall of the basket. The centrifugal force produced by the rapid rotation of the basket acts in the radially outward direction but the droplets of water on the inner surface of each lettuce leaf are to a large extent prevented from moving outwardly through the wall of the basket into the outer container by the lettuce leaf on which they are resting. The droplets of water on the outer surface of each lettuce leaf is in most cases prevented from moving outwardly by a further lettuce leaf positioned radially outside it. Accordingly, even after the lettuce leaves have been spun a considerable proportion of the original water content is still present and is not removed into the outer container. However, the basket in accordance with one or more embodiments of the present disclosure includes a plurality of inwardly projecting portions extending over a significant proportion of the height of the side wall. When wet lettuce leaves are inserted into the basket and spun, they are again forced radially outwards into contact with the side wall of the basket but the presence of the inwardly projecting portions or protuberances means that a significant proportion of the lettuce leaves do not extend in the circumferential direction, as in the conventional spinner, but instead extend in a direction which has a significant radial component. The radially outward centrifugal force produced by the spinning motion of the basket therefore results in those droplets which are resting on a portion of a lettuce leaf extending in a direction with a radial component are caused to move outwardly along the surface of the lettuce leaf and thus ultimately through the apertures in the side wall of the basket into the outer container. It is therefore found that a significantly higher proportion of the water carried by wet lettuce leaves is removed. The basket side wall may be generally conical, preferably increasing in diameter progressively in the upward direction and this generally conical form may assist in causing produce such as lettuce leaves placed against it, e.g. by centrifugal forces, not to lie absolutely perpendicular to centrifugal forces present. This encourages water drainage/removal from the basket therefore since the centrifugal forces assist better in moving the water off the produce.

In order that the inwardly projecting portions have the desired effect, it is necessary that they have a significant size in the radial direction and it is preferred that these portions have a maximum dimension in the radial direction of 10 to 30%, preferably 15 to 25%, of the maximum radius of the basket. It is preferred also that the inwardly projecting portions occupy a significant proportion of the total circumference of the basket and it is found that the maximum water-removing efficiency is achieved if the inwardly projecting portions have a total length in the circumferential direction of 40 to 70%, preferably 50 to 60%, of the maximum circumference of the basket. It is preferred that the projecting portions extend over at least 50% and preferably over 75% or more of the height of the basket.

The inwardly projecting portions of the side wall of the basket may have a variety of different shapes but it is preferred that they are each of generally triangular shape in cross-section perpendicular to the axis of rotation, whereby each inwardly projecting portion has a first surface, which is the leading surface with respect to the direction of rotation, and a second surface which is the trailing surface with respect to the direction of rotation, the first surfaces being inclined to the radial direction by an angle which is substantially greater than the angle by which the second surfaces are inclined to the radial direction. It is found that this difference in the angles of the two surfaces of the inwardly projecting portions results in a further enhancement of the water-removing efficiency. What is meant by the "radial direction" is the direction that the outer end of a radial line extending from a central axis to the side wall of the basket moves and this may therefore be considered the local direction of motion or tangential. The difference in the angles of the two surfaces is advantageously considered to enable highly effective pushing of the produce, e.g. vegetables such as lettuce leaves, in the basket by the first surface in the direction of rotation due to its angle to the local direction of basket motion in the tangential direction being high e.g. at about 50 to 70°, typically 60°. The less sloped second surface, e.g. at a lower angle of about 10 to 30°, typically 20° (see FIG. 2), to the local direction of motion still promotes water run-off from produce, such as lettuce leaves or other salad or food materials because the surface is not perpendicular to centrifugal forces during spinning. Also, this provides a larger surface area of the trailing surfaces and of apertures on the trailing surfaces, an advantage compared to prior art such as CN203776743-U or U.S. Pat. No. 5,184,544: the second surface is sloped relative to perpendicular to local centrifugal forces during spinning so water will easily drain from this relatively large area due to the centrifugal forces being present and acting on water which is touching surfaces (both of the inwardly protruding projections and of produce such as lettuce leaves pressed up against them by the centrifugal forces) that are themselves sloped relative to perpendicular to local centrifugal forces present during spinning of the basket. In contrast, prior arrangements have a substantial proportion of the basket area perpendicular to local centrifugal forces and product such as lettuce leaves may thus also be spun while more substantially perpendicular to local centrifugal forces such that it is more difficult for water to be removed. With a basket that is intended to be driven in only one direction, as is possible in some preferred embodiments of the present disclosure, this advantageously provides highly effective water draining/removal from the produce when the basket is spun in that direction, superior to arrangements of the prior art, such as CN203776743-U, which can be spun in both directions but only with moderate and relatively equal water draining/removal performance in both spin directions.

A further aspect of the disclosure comprises a salad spinner comprising the basket of the first aspect of the disclosure and a drive system for rotationally driving the basket, the drive system being adapted to drive the basket in a rotational direction in which the first surfaces of the inwardly projecting portions are leading surfaces. The drive system may be adapted to drive the basket rotationally only in said rotational direction. When non-symmetrical inwardly projecting portions are employed as described above, i.e. with first surfaces at a larger angle to the local direction of motion than the second surfaces, this ensures that the user can always operate the device in a direction giving very high water drainage/removal performance. The user need not choose the direction of spin since operation of the drive system will only drive in one direction.

The first or leading surfaces of the inwardly projecting portions may extend generally in the axial direction but it is preferred that they are inclined upwardly and rearwardly with respect to the direction of rotation because this results in a yet further increase in the water-removing efficiency. This leaning is highly advantageous since it cleverly works with the centrifugal forces encountered upon spinning the basket to enable water to flow up the first surfaces to exit apertures of the basket.

The trailing second surfaces may lean upwardly and outwardly, providing a further enhancement of water-removing efficiency compared to prior art such as U.S. Pat. No. 5,184,544 and CN203776743-U because centrifugal forces present as the basket rotates will cause water to move axially on the trailing second surfaces so that water is taken off to a drainage aperture.

The base of the basket may have generally conventional construction but it is preferred that it comprises a plurality of angularly spaced pairs of adjacent, generally radially extending bars, each of which is integral with a plurality of circumferentially extending, radially spaced circumferential bars, which are integral also with the closest bar of the adjacent pair of bars, the trailing bar in the direction of rotation of each pair of bars being spaced over at least part of its length from the adjacent leading bar in the axial direction, whereby a drainage aperture as defined by each pair of adjacent bars directed in the direction of rotation. Thus in this embodiment the base of the basket has a plurality of upwardly directed apertures defined by adjacent pairs of circumferential bars and two radial extending bars of adjacent pairs of such bars. Droplets of water may therefore simply drop down through these apertures into the outer container. However, the base also has a number of forwardly facing apertures in the direction of rotation of the basket. Droplets of water on the circumferential bars tend to move rearwardly along those bars when the basket is rotated but in the present embodiment such rearwardly facing droplets soon encounter a forward facing aperture and will then pass through that aperture into the outer container. The drainage efficiency is thereby further enhanced.

When installed as part of a salad spinner, the basket will be rotationally coupled to a rotary transmission member, which is in turn rotationally coupled to a rotary actuator of the vegetable spinner. The present disclosure also provides a basket as referred to above in combination with a rotary transmission member in the form of a lid, which extends over the open end of the basket and may be rotationally coupled to the basket and to a rotary actuator of the vegetable spinner so as to transmit rotational motion from the rotary actuator to the basket, the rotary transmission member comprising a plurality of circumferentially spaced segmental panels, the leading edge in the direction of rotation of each panel being spaced, over at least a proportion of its length, in the axial direction from the trailing edge of the adjacent panel, whereby each adjacent pair of panels defines an air flow aperture directed in the direction of rotation. Thus in this embodiment, the rotary transmission member, which forms so to speak an inner lid for the basket, defines a number of forwardly spaced apertures. As the basket is rotated at high speed, air is forced through these apertures into the interior of a basket and this flows through lettuce leaves or the like within the basket and through the apertures in the basket into the outer container. However, this air flow also tends to carry with it some of the water droplets carried by the lettuce leaves and the water drainage efficiency is thereby yet further enhanced.

The present disclosure also provides a vegetable spinner including an outer open-topped container with a base as well as the basket of the first aspect hereof. The open-topped container may be transparent, wherein a user may observe the water removal flow and rate of change of water removal flow through the basket as the basket is spun inside the container. This is advantageous since the user can see how much rotation to apply. The base may have an internal surface which affords central rotary support on which a basket of the type referred to above is supported for rotation about a central axis, an outer lid removably closing the outer container, rotary actuating means carried by the outer lid and transmission means rotationally coupled to the actuating means and to the basket, whereby operation of the actuation means results in spinning of the basket within the outer container about the central axis.

It is preferred that the actuating means includes a rotatable actuating gear wheel and the transmission means is in the form of a disc with a first set of teeth in mesh with the actuating gear wheel and a second set of teeth in mesh with a further set of teeth on the side wall of the basket, the transmission means including a plurality of generally radially extending, angularly spaced ribs, the space between each adjacent pair of ribs being substantially occupied by a web which is integral with leading edge of the trailing rib, in the intended direction of rotation of the basket, but is spaced in the axial direction from the trailing edge of the leading rib, over at least part of its length in the radial direction, whereby an opening is provided.

BREIF DESCRIPTION OF THE DRAWING

Further features and details of the disclosure will be apparent from the following description of one specific embodiment of a vegetable spinner and an associated basket, which is given by way of example only with reference to the accompanying drawings, in which.

DETAILED DESCRIPTION

Figure 1:
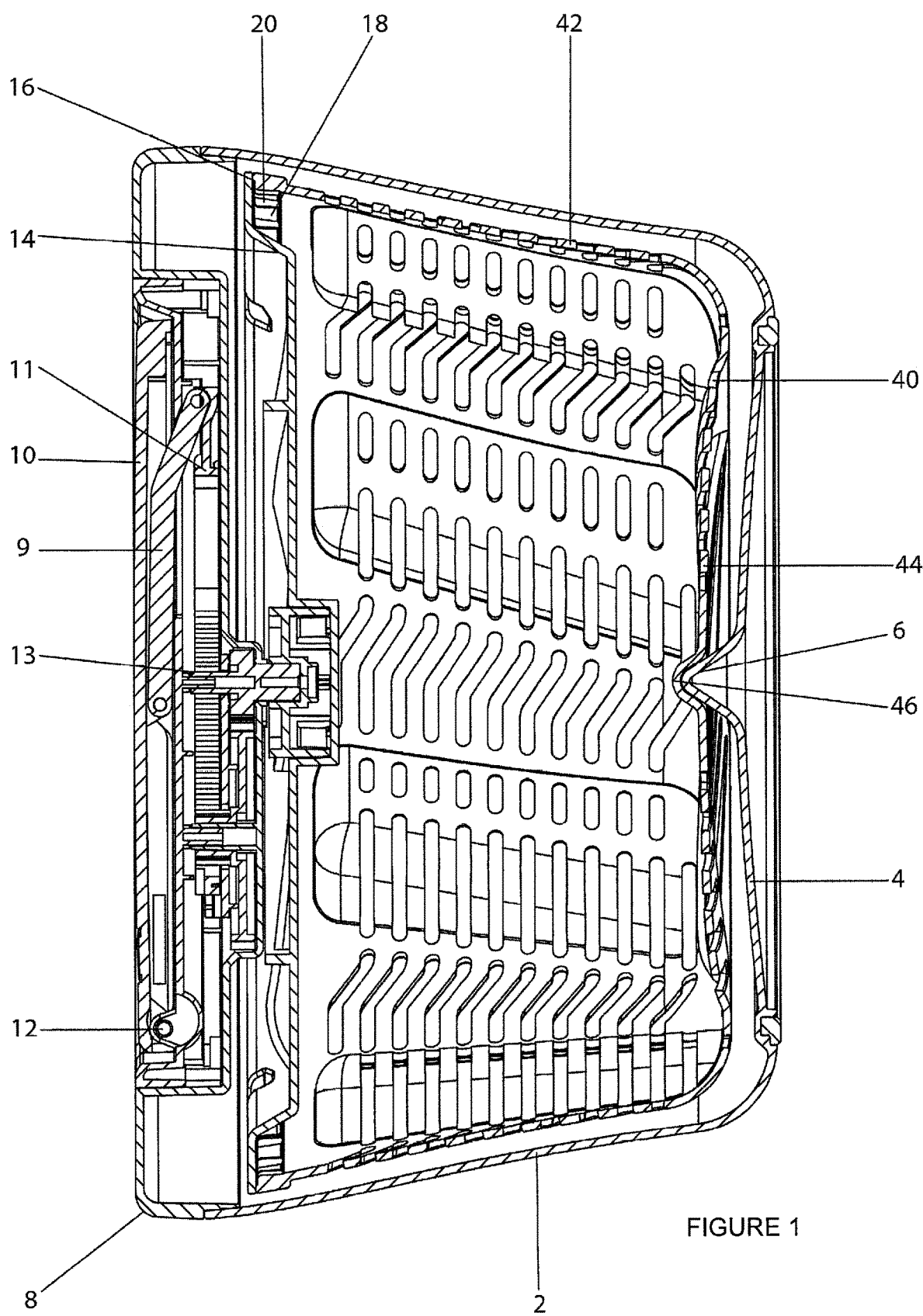
FIG. 1 is an axial sectional view of a vegetable spinner.

Referring firstly to FIG. 1, the vegetable spinner includes an open-topped outer container with a side wall 2, which is substantially cylindrical but whose diameter increases progressively in the upward direction, and a base 4. The base 4 is slightly domed and thus extends downwardly in all directions from its centre and positioned at its centre is an upward protuberance 6, which acts as a rotational support for the basket. The outer container 2, 4 is closed at the top by an outer lid, which is generally designated 8. Accommodated within the lid is a manual actuation lever 10, which is pivotally connected to the lid 8 at one end to pivot about an axis 12. The lever 10 is movable pivotally from the position shown in FIG. 1 in which it is received within a recess in the upper surface of the lid 8 and its surface is substantially flush with the surface of the lid, and an operative position in which it has been rotated about the axis 12 and projects upwardly from the lid. The outer lid and the manual actuation lever form no part of the present invention and will therefore not be described in detail. In this case, however, the manual actuation lever 10 is pivotally connected to one end of an arm 9, the other end of which is pivotally connected to a slider 11 mounted to reciprocate linearly within the outer lid 8 in a horizontal plane. Formed on the slider are one or more sets of gear teeth, which constitute a rack and are in mesh with complementary gear teeth on a pinion wheel 13. The pinion wheel 13 is connected by one or more further pinion wheels to rotate an externally toothed actuating wheel 15, which is mounted on the outer lid for rotation about a vertical axis, which is coincident with the axis of the outer container 2, 4 and thus passes through the centre of the protuberance 6.

Figure 4:
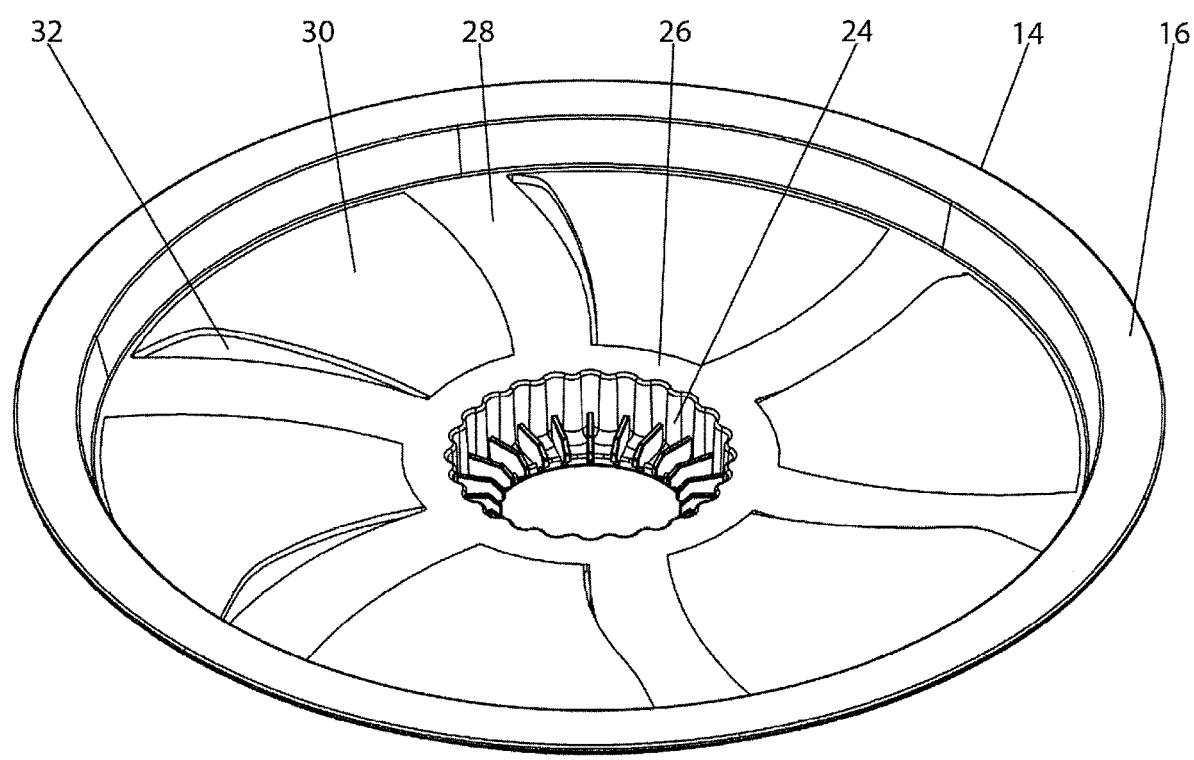
FIG. 4 is a perspective view from above of the transmission disc.
Figure 5:
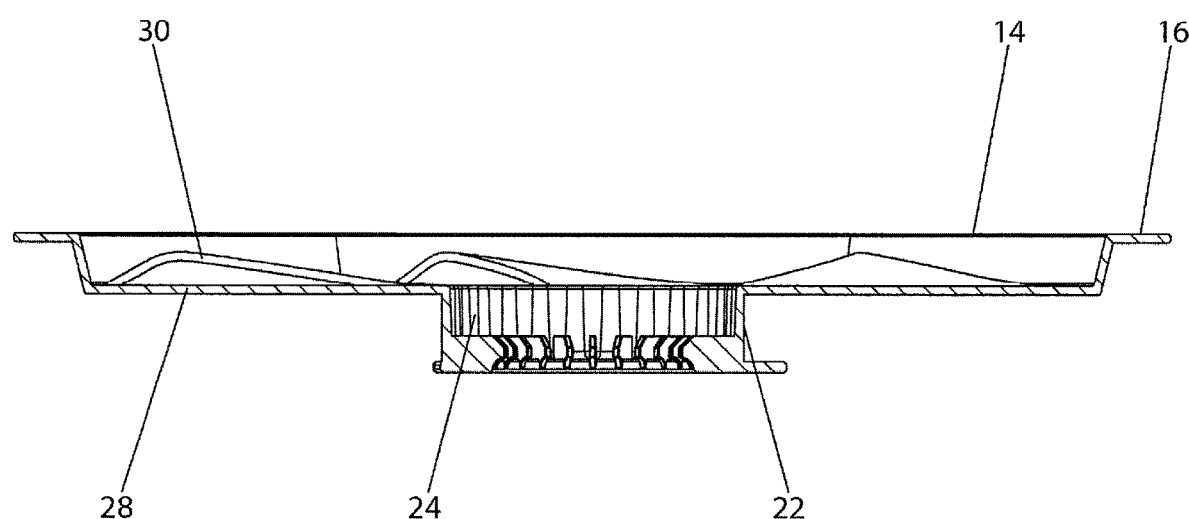
FIG. 5 is an axial sectional view of the spinner disc.

The basket 2, 4 is closed by an inner lid 14, which is best seen in FIGS. 4 and 5. The inner lid 14, which acts also as a rotation transmission member, has an outer rim 16, which rests on the upper edge of a spinner basket, which will be described below. Formed on or adjacent the outer rim 16 is a number of gear teeth 18, which are shown in FIG. 1 but have been omitted from FIG. 5 for the sake of clarity. These gear teeth 18 are in mesh with corresponding gear teeth 20 on the upper inner edge of the basket such that rotational movement of the inner lid 14 is transmitted also to the basket. Formed at the centre of the inner lid 14 is a recess or well 22, formed on the side wall and/or base of which are internal gear teeth, which are in mesh with the external gear teeth on the actuator gearwheel 15. Pivotal movement back and forth of the actuation lever 10 results in linear reciprocation of the slider 11 and this results in turn in rotation of the pinion wheel 13 and thus in rotation of the actuating wheel 15 and this is transmitted to the transmission component 14 and then to the spinner basket. The central recess 22 in the inner lid is surrounded by a peripheral web 26 and the web 26 is integral with a plurality, in this case 6, of generally radially extending webs 28, which are integral also with the outer rim 16. The space between each adjacent pair of radial webs 28 is occupied by a panel 30, which is connected to the leading edge of the trailing web 28, in the direction of rotation, of the pair of webs and is integral also with the web 26 and the rim 16. However, the leading edge of each panel is spaced from the trailing edge of the leading web 28 such that openings 32 are formed, which face forwardly with respect to the direction of rotation of the inner lid 14.

Figure 2:
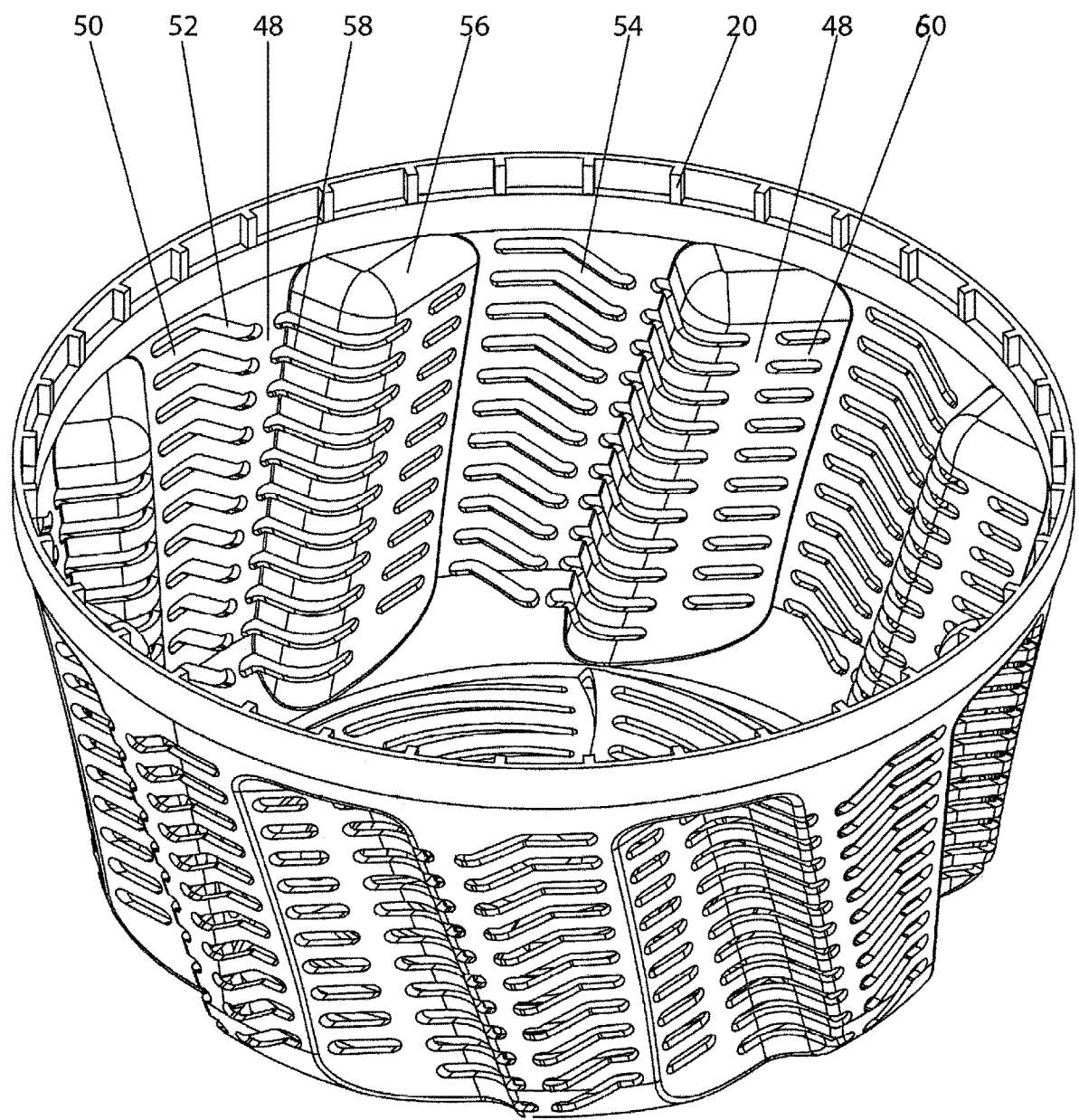
FIG. 2 is a perspective view from above of the spinner basket.
Figure 3:
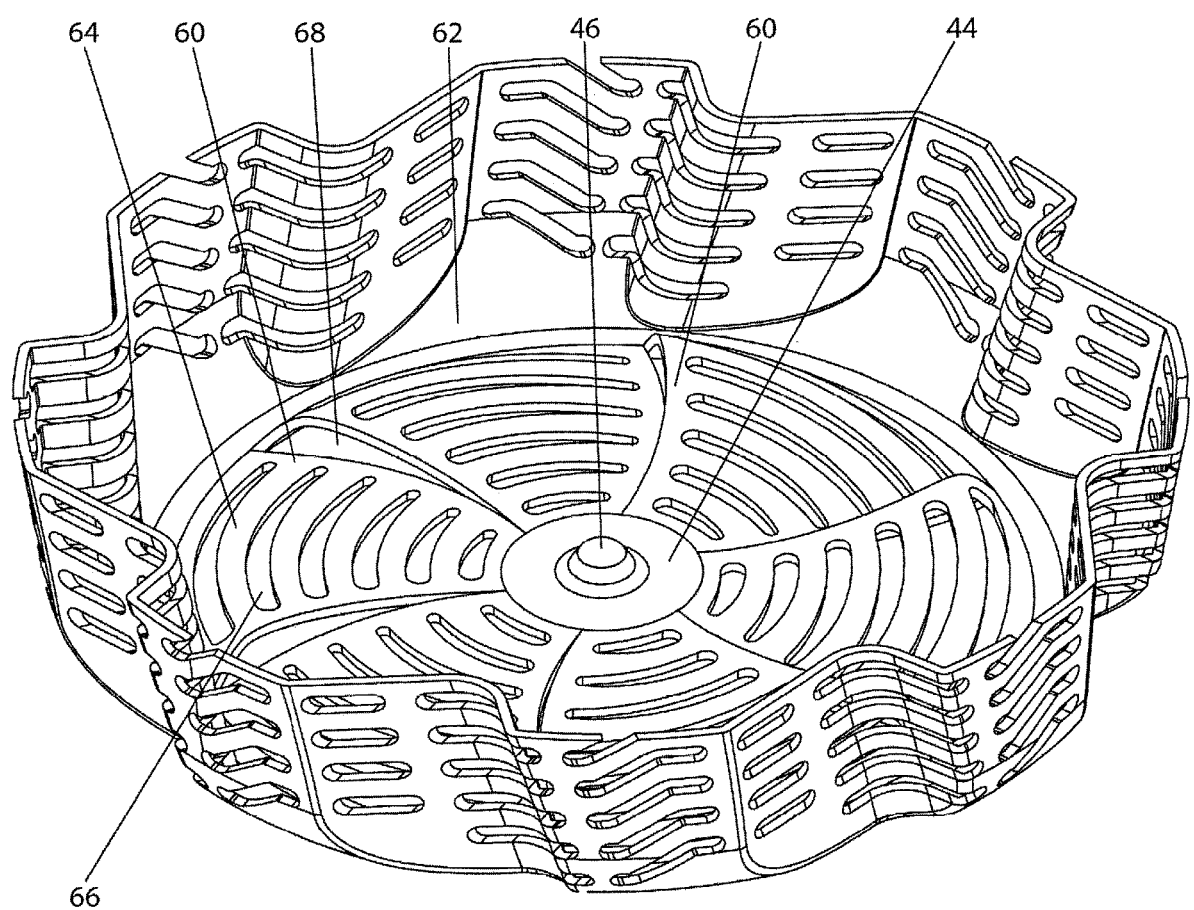
FIG. 3 is a similar perspective view from above of the basket whose side wall has been partially cut away so as to show the detail of the base of the basket.

As seen in FIGS. 1, 2 and 3, the spinner basket comprises, as is usual, a circular base 40, integral with whose outer edge is an upstanding side wall 42, which is of generally cylindrical shape but whose diameter progressively increases in the upward direction. The base 40 includes an imperforate central section 44, formed in the centre of which is an upstanding protuberance 46, which defines a downwardly facing recess, which accommodates the protuberance 6 on the base of the outer container and constitutes a rotational support for the basket, such that it may spin about a vertical axis defined by the protuberance 6.

The side wall 42 of the basket includes a plurality of first webs 48, which extend generally in the axial direction and are integral with the outer edge of the base and are spaced apart in the circumferential direction. Integral with each adjacent pair of generally axially extending webs 48 are a number of axially spaced, generally circumferentially extending webs 50. Each adjacent pair of webs 50 defines an aperture 52 in the side wall.

As thus far described, the spinner basket is of conventional construction but it differs from the conventional construction in that the side wall 42 is not of regular cylindrical shape but instead comprises a number of circumferentially spaced, generally part-cylindrical spacer portions 54, situated between which are inwardly projecting portions 56 of generally triangular shape in transverse cross-section. The inwardly projecting portions 56 extend generally in the axial direction and include a first leading surface 58, which is the front surface in the direction of rotation of the basket and is inclined to the radial direction by between about 50° to 70°, typically 60°. Whilst each leading surface 58 could extend precisely in the axial direction, it is preferred that it extends upwardly and rearwardly in the direction of rotation of the basket and is inclined to the axial direction by between 10° and 30°. Each inwardly projecting portion 56 also includes a trailing surface 60, which is the rear surface in the direction of rotation, which is inclined by a smaller angle typically between 20° and 40° to the radial direction. What is meant by the "radial direction" is the direction that the outer end of a radial line extending from a central axis to the side wall of the basket moves and this may therefore be considered the local direction of motion or tangential.

The base of the container includes a plurality, in this case 6, of pairs of generally radially extending bars 60, which are integral with the central imperforate region 44 and also with an outer generally annular imperforate region 62, with which the side wall is integral. Integral with each radial bar 60 is a plurality of radially spaced circumferential bars 64, which are integral also with the closest bar of the adjacent pair of bars. Each adjacent pair of circumferential bars 64 defines an aperture 66. The radial bars 60 of each adjacent pair of bars are not coplanar and instead the trailing bar of the pair is spaced somewhat above the leading bar of the pair such that an aperture 68 is formed directed forwardly in the direction of rotation of the basket.

If it is desired to use the spinner to dry e.g. lettuce leaves that have been washed and are therefore wet, the inner and outer lids are removed and the lettuce is placed in the basket. The inner lid is then replaced whilst ensuring that the gear teeth on its exterior are in mesh with the gear teeth on the basket and the outer lid is then placed on top of it, again ensuring that the actuator gearwheel on its lower surface is in mesh with the gear teeth formed on the inner lid. The actuator handle is then operated and this causes the basket to spin at high speed. The centrifugal force acting on the lettuce leaves forces them outwardly into contact with the side wall of the basket and the presence of the inwardly projecting portions means that a significant proportion of the length of the lettuce leaves extend in a direction which has a significant radial component. Accordingly, the centrifugal force acting on the droplets of water adhering to the lettuce leaves causes them to move both outwardly and along the length of the lettuce leaves until they can pass out of the basket through the apertures 52 in the side wall. Droplets of water adhering to the leading surface 58 of the inwardly projecting portions are caused to move not only outwardly but also upwardly, due to the rearward inclination of the surfaces 58 and such upward movement will rapidly result in the droplets encountering an aperture 52 and thus passing out of the basket. Droplets resting on the base of the basket will in practice be resting on one of the circumferential bars 64 and the rotational movement of the basket will result in those droplets moving rearwardly on the circumferential bars until they encounter one of the forwardly facing apertures 68 and they will then also pass out of the basket into the outer container. As the inner lid 14 rotates, air in the outer container will be driven into the forwardly facing apertures 32 and this air will then flow through the basket and out of it into the outer container. This air flow tends to entrain water droplets with it and to contribute to yet a further enhancement of the water-removing efficiency of the spinner.

The invention claimed is:
1. A basket for a vegetable spinner comprising:
   a generally circular base affording a rotary mount in its center defining an axis about which, in use, the basket rotates in a direction of rotation; and
   an upstanding side wall integral with an outer edge of the base, the side wall comprising:
      a plurality of first webs integral with and upstanding from the outer edge of the base and spaced apart in a circumferential direction;
      a plurality of second webs integral with the first webs and spaced apart in an axial direction, the first and second webs defining a plurality of apertures; and
      a plurality of inwardly projecting portions which extend over at least a major proportion of the height of the side wall and are spaced apart in the circumferential direction by spacer portions of substantially part-circular shape in cross-section perpendicular to the axis of rotation;
   wherein each inwardly projecting portion of the side wall is of generally triangular shape in cross-section perpendicular to the axis of rotation;
   wherein each inwardly projecting portion has a first surface, which is a leading surface with respect to the direction of rotation, and a second surface, which is a trailing surface with respect to the direction of rotation, the first surfaces being inclined to the radial direction by an angle which is substantially greater than the angle by which the second surfaces are inclined to the radial direction; and
   wherein the first surfaces are inclined upwardly and rearwardly with respect to the direction of rotation.

2. The basket as claimed in claim 1, wherein the inwardly projecting portions have a maximum dimension in the radial direction of 10% to 30% of the maximum radius of the basket.

3. The basket as claimed in claim 1, wherein the inwardly projecting portions have a total length in the circumferential direction of 40% to 70% of the maximum circumference of the basket.

4. The basket as claimed in claim 1, wherein the base comprises a plurality of angularly spaced pairs of adjacent generally radially extending bars, each of which is integral with a plurality of circumferentially extending, radially spaced circumferential bars, which are integral also with the closest bar of the adjacent pair of bars, the trailing bar in the direction of rotation of each pair of bars being spaced over at least part of its length from the adjacent leading bar in the axial direction, whereby a drainage aperture is defined by each pair of adjacent bars directed in the direction of rotation.

5. The basket as claimed in claim 1, further comprising a rotary transmission member in the form of a lid, which extends over the open end of the basket and is rotationally coupled to the basket and to a rotary actuator of the vegetable spinner so as to transmit rotational motion from the rotary actuator to the basket.

6. A vegetable spinner including comprising:
   an outer open topped container with a base whose internal surface affords a central rotary support on which the basket as claimed in claim 1 is supported for rotation about a central axis;
   an outer lid removably closing the outer container;
   a rotary actuator carried by the outer lid; and
   a transmission rotationally coupled to the rotary actuator and to the basket,
   wherein operation of the rotary actuator results in spinning of the basket within the outer container about the central axis.

7. The vegetable spinner as claimed in claim 6, wherein:
   the rotary actuator comprises a rotatable actuating gear wheel; and the transmission comprises a disc with a first set of teeth in mesh with the actuating gear wheel and a second set of teeth in mesh with a further set of teeth on the side wall of the basket.

8. The vegetable spinner as claimed in claim 7, wherein the transmission further comprises a plurality of generally radially extending, angularly spaced ribs.

9. The vegetable spinner as claimed in claim 8, wherein the space between each adjacent pair of ribs is substantially occupied by a web.

10. The vegetable spinner as claimed in claim 9, wherein each web is integral with a leading edge of a trailing rib in the intended direction of rotation of the basket but is spaced in the axial direction from the trailing edge of the leading rib over at least part of its length in the radial direction to define an opening.

11. The basket as claimed in claim 1, wherein the inwardly projecting portions have a maximum dimension in the radial direction of 15% to 25% of the maximum radius of the basket.

12. The basket as claimed in claim 1, wherein the inwardly projecting portions have a total length in the circumferential direction of 50% to 60% of the maximum circumference of the basket.

13. The basket as claimed in claim 5, wherein:
the rotary transmission member comprises a plurality of circumferentially spaced segmental panels; and
a leading edge of the panels in the direction of rotation of each panel is spaced, over at least a proportion of its length, in the axial direction from a trailing edge of an adjacent panel such that each adjacent pair of panels defines an air flow aperture directed in the direction of rotation.

* * * * *